United States Patent Office 3,107,253
Patented Oct. 15, 1963

3,107,253
EPOXY ACETALS
George B. Payne, Berkeley, Calif., assignor to Shell Oil Company, New York, N.Y., a corporation of Delaware
No Drawing. Filed Oct. 12, 1961, Ser. No. 144,551
5 Claims. (Cl. 260—348)

This invention relates to novel acylated epoxy acetals and to a process for their preparation.

Acylated epoxy compounds containing a single oxirane group are known in the prior art. For example, U.S. Patent 2,891,969 (June 23, 1959), shows the preparation of compounds such as 3-phenyl-2,3-epoxypropane-1,1-diacetate by the reaction of 3-phenyl-2-propene-1,1-diacetate with peracetic acid. Hemiacetal ester epoxides are disclosed in U.S. 2,917,521 (December 15, 1959), and are prepared by the epoxidation of the double bond in a 3-cyclohexenylmethyl hemiacetal ester of an aldehyde such as acetaldehyde. Hemiacetal ester epoxides containing a single acetate group and a single oxirane moiety are also discussed in U.S. 2,883,396 (April 21, 1959). Other related compounds (such as beta-lactones) which contain an epoxy group are formed by reacting ketene with aldehydes such as glycidaldehyde as disclosed in U.S. 2,940,982 (June 14, 1960), to produce 4,5-epoxy-beta-pentalactones.

It is an object of the present invention to provide a new class of acetals which contain one or more epoxide rings, one or more ether linkages, and a single acyloxy linkage in the molecule. A further object of my invention is to provide a class of acetals derived from an epoxyaldehyde, an alcohol, and a substituted or unsubstituted ketene.

Another object of my invention is to provide a convenient method of synthesizing the compounds of my invention. Other objects will be apparent from the following detailed description of my invention.

The compounds of the present invention are useful for a variety of purposes. The epoxide rings of these compounds are readily hydrolyzed to form the corresponding polyhydric compounds which are useful as hardeners for epoxy resins, solvents, and as chemical intermediates in the manufacture of a large variety of chemicals. The acyloxy acetals of the present invention are also useful as reactive diluents for epoxy resins. A reactive diluent may be defined as a material which chemically and physically modifies the properties of a resin, first by physical dilution and then by reaction with the active groups of the resin when the resin is cured. Reactive diluents are generally less expensive than the resins which they modify and are therefore widely used in industry to prepare resins with particularly desirable properties.

The acetals of the present invention are characterized by the presence of the following functional groups in the molecule:

(1) A vicinal epoxy group:

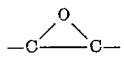

(2) An acyloxy group:

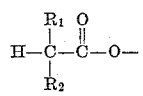

wherein $R_1$ and $R_2$ are hydrogen or hydrocarbon groups of from 1–16 carbon atoms, and (3) An acetal linkage:

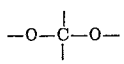

Thus the compounds of the present invention may be represented by the formula:

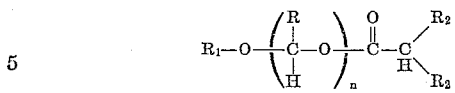

wherein $R_1$ is the residue of an organic alcohol containing up to 12 carbon atoms, R is an organic radical of up to 20 carbon atoms containing at least one oxirane

group, $R_2$ and $R_3$ may be hydrogen or a monovalent hydrocarbon group of up to 10 carbon atoms, and $n$ is an integer of from 1 to 3. $R_2$ and $R_3$ are preferably alkyl groups or hydrogen. When either $R_2$ or $R_3$ are alkyl groups, the lower alkyl groups with from 1 to 4 carbon atoms are preferred. By the "residue of an organic alcohol" is meant the radical formed when a single hydroxyl group is removed from a monohydric or polyhydric alcohol.

The compounds of the present invention represent a particular class of linear substituted polyethers which may be designated as polyepoxyalkyl-polyoxaalkyl alkanoates. These compounds are most conveniently named by the epoxy nomenclature in combination with the "oxa" system for naming linear polyethers. For example, referring to the formula of the preceding paragraph, when $R_1$ is n-butyl, each R is a 2,3-epoxypropyl radical, $R_2$ is ethyl, $R_3$ is methyl and $n$ is 3, the resulting compound is 1,3,5-tris(2,3-epoxypropyl) - 2,4,6 - trioxadecane-2-methyl butyrate. The compounds may also be named as derivatives of acetic acid such as 1-(3,4-epoxycyclohexyl)-3 - (1,2 - epoxybutyl) - 5 - (3,4 - epoxypentyl) - 2,4 - dioxapentyl phenylmethyl acetate. Another example using the alkanoate nomenclature is 1,3-bis(1,2,4,5-diepoxypentyl)-2,4-dioxahexyl decanoate.

The compounds of the present invention may be conveniently arranged according to their structural formulas into three different classes:

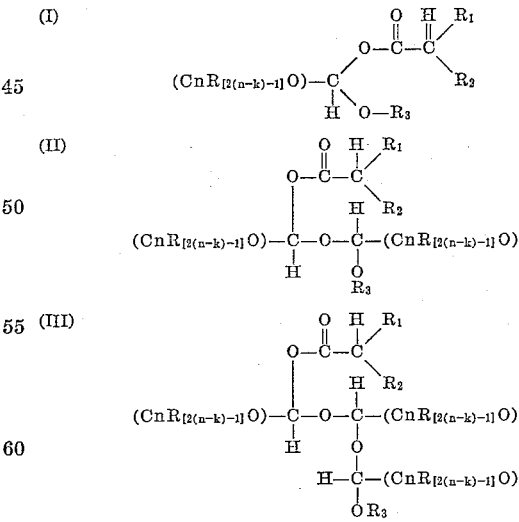

In the above formulas (I–III) R, $R_1$ and $R_2$ are selected from the group consisting of hydrogen and hydrocarbon radicals with from 1 to 10 carbon atoms; $R_3$ is the organic residue of a monohydric or polyhydric alcohol of from 1 to 10 carbon atoms which may contain an epoxide group; and $(CnR_{[2(n-k)-1]}O)$ represents an epoxyalkyl group in which the oxygen molecule bridges a pair of adjacent carbon atoms; $n$ is a positive integer from 3 to 20, and $k$ is 0 or 1. When $k$ is 1 $(CnR_{[2(n-k)-1]}O)$ is an epoxidized cyclic hydrocarbon. Specific examples of $R_3$ include groups such as:

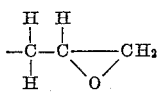

and

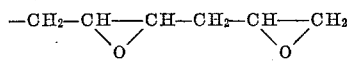

The process by which the novel compounds of the present invention are prepared may be appropriately represented by means of the following equation which shows the reaction products formed by the reaction of an epoxyaldehyde, an alcohol, and a ketene:

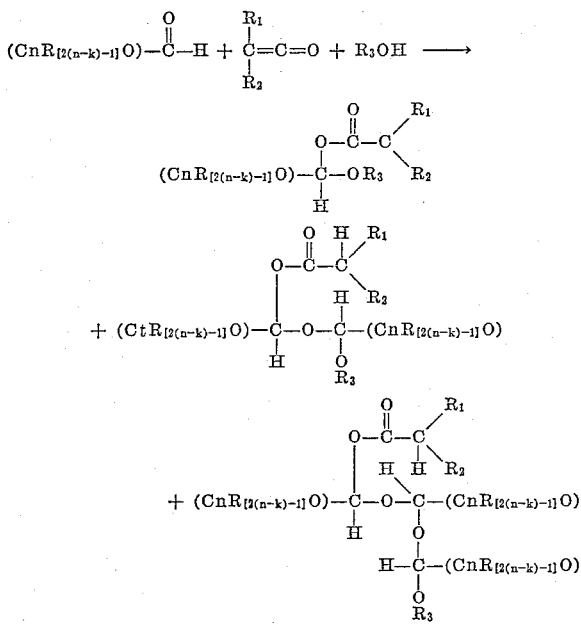

where $R$, $R_1$, $R_2$, $R_3$, $n$ and $k$ have the previously defined meanings.

The epoxyaldehydes with which the reaction of the present invention is carried out may be represented by the formula

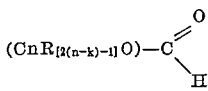

where $n$ is an integer from 3 to 20 and $k$ is 0 or 1. The oxygen atom in this organic radical bridges two vicinal carbon atoms to form the well known epoxy ring or oxirane group:

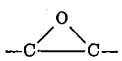

R represents a member selected from the group consisting of a hydrogen atom and an organic hydrocarbon group of from 1 to 10 carbon atoms. Preferred hydrocarbyl groups include alkyl, aryl, aralkyl, alkaryl and cycloalkyl radicals with from 1 to 10 carbon atoms. The epoxyaldehydes of the present invention may be conveniently prepared by epoxidation of the double bond of an unsaturated aldehyde. Thus, acrolein gives glycidaldehyde upon epoxidation of the olefinic double bond. Similarly, 2-methyl-2,3-epoxypropionaldehyde is prepared from alpha-methacrolein, 2,3-epoxybutyraldehyde from crotonaldehyde, 2,3-epoxy-2-methyl butyraldehyde from alpha-methylcrotonaldehyde, beta-phenyl-2,3-epoxypropionaldehyde from cinnamaldehyde, and corresponding p-1,p-epoxyalkanaldehydes are formed from p-1, p-alkenyl aldehydes, wherein the symbol $p$ represents an integer from 2 to 20. Other aldehydes included are 3,4-epoxybutyraldehyde and the epoxy compound obtained from the epoxidation of the ethylenic bond of citronellal.

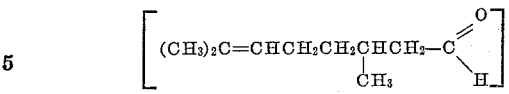

i.e., 3,7-dimethyl-6,7-epoxyheptanaldehyde. When $k$ is one in the formula:

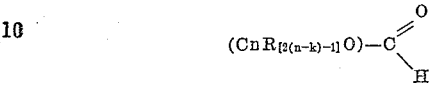

$n$ represents the number of ring carbon atoms and the formula thus represents cyclic epoxyaldehydes such as 1-formyl-3,4-epoxycyclohexane which are formed from cyclic unsaturated aldehydes containing a single double bond in the ring. Specific examples of such unsaturated aldehydes are 1-formyl-3-cyclohexene and 1-formyl-3-cyclopentene. The preferred ring size includes rings with from 5 to 7 ring carbon atoms. Rings with more than 7 ring carbons which give a planar structure on epoxidation are also operable. The maximum practical ring size is about 7 ring carbon atoms.

The alcohols of the present invention include the alkanols with from 1 to 20 carbon atoms. Monohydric epoxyalkanols are also useful reactive alcohols in the present invention and form a preferred class of reactants. Suitable epoxy alcohols include glycidol (2,3-epoxypropanol), 2,3-epoxybutanol, 2,3-dimethyl-4,5-epoxyoctanol, 3,4-epoxybutanol, 2,3-epoxyhexanol, 2,3-dimethyl-4,5-epoxyoctanol, 2-methoxy-4,5-epoxyoctanol, 2,3-epoxypropoxypropanol, 2,3-epoxypropoxyhexanol, 2,3-epoxypropoxyoctanol, 8,9-epoxyoctadecanol, 2,3-epoxydodecanol, 3,4-epoxydodecanol and the epoxidized alkenols such as epoxidized cyclohexenol, cyclopentenol, octadecenols, dodecenols, and tetradecenols. In general, the epoxy alcohols are prepared by epoxidation of the double bond of an alkenol or cycloalkenol to yield the corresponding epoxyalkanol or epoxycycloalkanol. Other suitable alcohols are set forth in U.S. 2,925,426. Polyepoxy alcohols such as are obtained by the epoxidation of polyunsaturated alcohols may also be used. The only structural requirequirement of the epoxidized alcohol is the presence of at least one hydroxyl radical.

The ketenes which are employed in the present invention have the structural formula

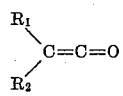

in which $R_1$ and $R_2$ are each selected from the group consisting of the hydrogen atom and a hydrocarbon radical of from 1 to 12 carbon atoms. Suitable hydrocarbyl radicals include alkyl, aryl, aralkyl, alkaryl, and cycloalkyl radicals with from 1 to 10 carbon atoms. Specific compounds include ketene itself and alkyl and aryl substituted ketenes such as methyl ketene, ethyl ketene, propyl ketene, butyl ketene, phenyl ketene, benzyl ketene, naphthyl ketene and the fully substituted ketenes such as dimethyl-, diethyl-, and dipropylketene, as well as methyl ethyl ketene, diphenyl ketene, phenyl propyl ketene, dibenzyl ketene, and similar compounds.

The ratio of the reactants may be varied over a wide range of values. The ratio of aldehyde to alcohol may vary from .1 to 3 moles of aldehyde per mole of alcohol. The ratio of ketene to aldehyde may vary from about .1 to 4 moles of ketene per mole of aldehyde reactant. The amount of ketene is preferably about a 10% molar excess based on the moles of aldehyde. Variation of the proportions of the reactants induces a change in the relative amounts of the reaction products which are produced. For example, if an equimolar amount of an aldehyde and alcohol are employed along with an excess of ketene (1.1 to 3 moles of ketene per mole of aldehyde), the yields of compounds I and II vary so that the yield (in percent based on moles of aldehyde) of compound I is from 2 to 5 times the percentage yield of compound II. By using a 2:1 molar ratio of aldehyde to alcohol, the ratios of the percentage yields (based on the aldehyde) of the compounds are:

$$\frac{\text{Percent compound I}}{\text{Percent compound II}} \approx \frac{1/2}{1}; \frac{\text{Percent compound II}}{\text{Percent compound III}} \approx \frac{1}{1}$$

That is, the product is about 20% of compound I, 35–40% of compound II, and 35–45% of compound III.

The three reactants may be added together simultaneously. However, much better yields are obtained when the aldehyde and alcohol are mixed before the addition of the substituted or unsubstituted ketene. The reactants may be added in increments over a period of time or simply mixed all at once. Other variations in the methods of combining the reactive materials will readily occur to those skilled in the art.

The reaction may be carried out at atmospheric pressure and at temperatures from −10° C. to about 60° C. Any pressure between about .1 atmosphere to 10 atmospheres is suitable. Although higher temperatures and pressures may be used, no particular advantage is obtained through the use of extreme reaction conditions and the process may be conveniently carried out at temperatures between 0° C. and 15° C. at atmospheric pressure.

The reaction is non-catalytic and may be carried out in the presence or absence of a solvent. For liquid reactants, or mutually soluble reactants, it is more convenient to proceed without a solvent because the extra step of separating the reaction products from the solvent is thereby obviated. For most of the reactions, however, it is preferable to use an inert solvent such as dioxane, tetrahydrofuran, diethyl ether, benzene, toluene, xylene or hydrocarbon solvents which are liquids at the temperature at which the reaction is being carried out.

The following examples illustrate the manner in which the invention may be carried out. It is to be understood, however, that the examples are for the purpose of illustration only and that the invention is not to be regarded as limited to any of the specific materials or conditions recited therein.

EXAMPLE I

Reaction of glycidaldehyde, ethyl alcohol, and ketene yields a mixture of acetoxy acetals according to the reaction:

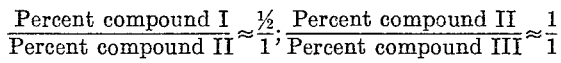

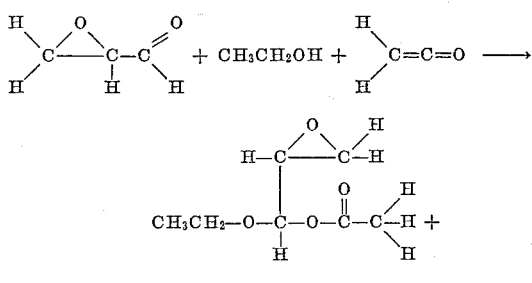

(I)

1-epoxyethyl-2-oxabutyl acetate

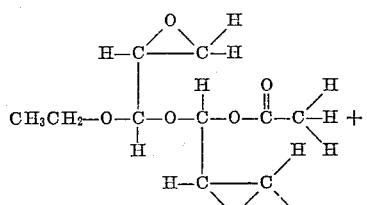

(II)

1,3-bis(epoxyethyl)-2,4-dioxahexyl acetate]

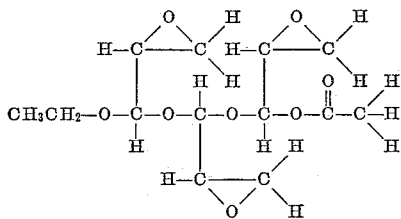

(III)

1,3,5-tris(epoxyethyl)-2,4,6-trioxaoctyl acetate

A mixture of 0.5 mole of glycidaldehyde and absolute ethanol was allowed to warm spontaneously to 70° C. When no longer exothermic, the solution was heated for 15 minutes on the steam bath at 80–85° C. and then cooled to room temperature. The mixture was dissolved in 200 ml. of ether and treated with 0.65 mole of ketene at 5° C. After 15 minutes longer in the cold, the solution was held at room temperature for one hour prior to concentration on the steam bath to a kettle temperature of 80° C. Claisen distillation afforded the following:

Cut I, 46–51° C. (<1 mm.), 52 g. $n_D^{20}$ 1.4225.
Cut II, 90–94° C. (<1 mm.), 16 g. $n_D^{20}$ 1.4446.
Residue, 3 g.

Cut I represents a 65% yield of 1-epoxyethyl-2-oxabutyl acetate.

| | Found, percent | Theory ($C_7H_{12}O_4$), percent |
|---|---|---|
| C | 52.6 | 52.5 |
| H | 7.5 | 7.6 |

Cut II represents a 28% yield of 1,3-bis(epoxyethyl)-2,4-dioxahexyl acetate.

| | Found, percent | Theory ($C_{10}H_{16}O_6$), percent |
|---|---|---|
| C | 52.0 | 51.7 |
| H | 6.9 | 6.9 |
| Epox. value, eq./100 g. (HCl-dioxane) | 0.71 | 0.86 |

EXAMPLE II

The reaction of this example is represented by the following equation:

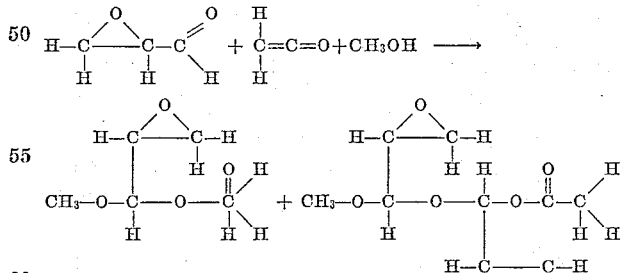

(acetoxy methyl glycidyl ether)   1,3-bis(epoxyethyl)-2,4-dioxapentyl
1-epoxyethyl-2-oxapropyl acetate           acetate

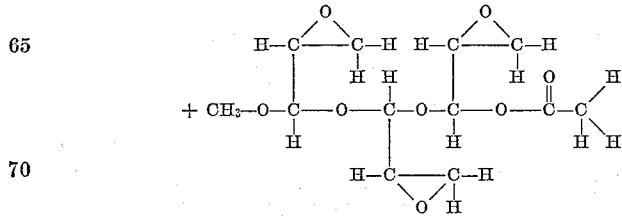

1,3,5-tris(epoxyethyl)-2,4,6-trioxaheptyl acetate

One mole of methyl alcohol and one-half mole (36 g.) of glycidaldehyde were mixed and allowed to warm spontaneously to approximately 80° C. About 150 ml. of diethyl ether and 1.1 moles of ketene were added at a temperature of between −25° C. and −20° C. The mixture was concentrated into a clean cold trap at room temperature and under a reduced pressure of 50 mm. of mercury. The concentrate was then vacuum distilled to give a mixture of acylated epoxy acetals. Further purification of the mixture of products by redistillation yielded 6.7 ml. (7.3 g.) of crude

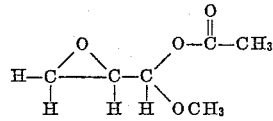

Analysis of the crude mixture of products for 1-epoxyethyl-2-oxapropyl acetate gave the following results:

|   | Found, percent | Theory ($C_6H_{10}O_4$), percent |
|---|---|---|
| C | 50.2 | 49.3 |
| H | 6.9 | 6.9 |
| Epox. value, eq./100 g | 0.47 | 0.68 |

EXAMPLE III

In this example the mole ratio of glycidaldehyde to ethanol was changed to two moles of glycidaldehyde per mole of ethanol.

Thirty-six grams (0.50 mole) of glycidaldehyde were mixed with 12 g. (0.25 mole) of absolute ethyl alcohol and allowed to warm to 60° C. The mixture was then placed on a steam bath and the temperature raised to 80–85° C. for ten minutes. One hundred milliliters of diethyl ether was added and the mixture stirred at a temperature below 10° C. while bubbling in ketene (0.35 mole) at a rate of approximately 0.41 mole/hour. The reactants were stirred for an additional hour at a temperature of 5–10° C. The mixture of products was separated by vacuum distillation into the three compounds with the structural formulas shown in the equation of Example I.

I. $C_7H_{12}O_4$ (1-epoxyethyl-2-oxabutyl acetate) (15.5 g.) 20% yield based on glycidaldehyde.

II. $C_{10}H_{16}O_6$ (1,3-bis(epoxyethyl)-2,4-dioxahexyl acetate) (19.8 g.) 34% yield based on glycidaldehyde.

III. $C_{13}H_{20}O_8$ (1,3,5-tris(epoxyethyl)-2,4,6-trioxaoctyl acetate) (21 g.) 42% yield based on glycidaldehyde.

|   | Found, percent | Theory ($C_{13}H_{20}O_8$), percent |
|---|---|---|
| C | 51.9 | 51.3 |
| H | 6.3 | 6.6 |
| Epox. value, eq./100 g | 0.77 | 0.99 |

Total yield based on glycidaldehyde was 96%.

The product distribution may be conveniently varied in the present invention by merely varying the mole ratio of aldehyde to alcohol. This aspect of the invention may be illustrated by the following table which summarizes the results of Examples II and III.

From the arrangement of the data in Table 1 it is apparent that the percent yield is a function of the mole ratio of aldehyde to alcohol and that the relative proportions of the products may be continuously varied by changing the initial aldehyde-alcohol mole ratio.

*Table 1*

| Compound No. | Empirical formula of compound | Molecular weight to nearest gram | Mole ratio of aldehyde to alcohol | Percent yield of acylated epoxy acetal [1] | Ratio of percent of I to percent of II ($P_1/P_2$) | Ratio of percent of II to percent of III ($P_2/P_3$) |
|---|---|---|---|---|---|---|
| I | $C_7H_{12}O_4$ | 160 | 1 | 65 ($P_1$) | 2.3 | 4.7 |
| II | $C_{10}H_{16}O_6$ | 232 | 1 | 28 ($P_2$) | | |
| III | $C_{13}H_{20}O_8$ | 304 | 1 | 6 ($P_3$) | | |
| | | | | Total 99 | | |
| I | $C_7H_{12}O_4$ | 160 | 2 | 20 ($P_1$) | 0.6 | 0.8 |
| II | $C_{10}H_{16}O_6$ | 232 | 2 | 34 ($P_2$) | | |
| III | $C_{13}H_{20}O_8$ | 304 | 2 | 42 ($P_3$) | | |
| | | | | Total 96 | | |

[1] Based on moles of aldehyde charged to the reaction.

EXAMPLE IV

In this example an additional epoxy group is introduced into the final product by reacting an alcohol containing at least one epoxy ring according to the equation:

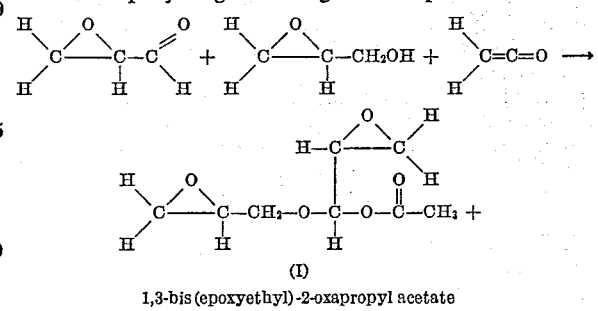

(I)
1,3-bis(epoxyethyl)-2-oxapropyl acetate

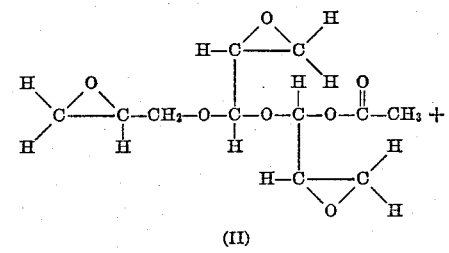

(II)
1,3,5-tris(epoxyethyl)-2,4-dioxapentyl acetate

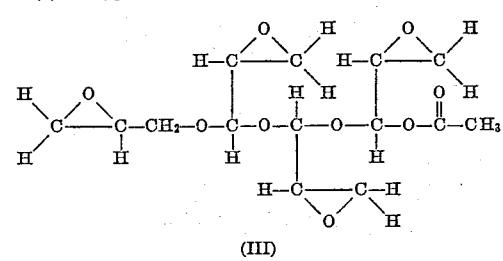

(III)
1,3,5,7-tetrakis(epoxyethyl)-2,4,6-trioxanonyl acetate

One mole (72 g.) of glycidaldehyde and one mole of glycidol (74 g.) were mixed. The mixture was heated to about 50° C. and allowed to exotherm to about 68° C. When no longer exothermic, heating was continued on a steam bath for about one-half hour and then the mixture was allowed to cool to room temperature. Five hundred milliliters of ethyl ether was added as a solvent and ketene (1.1 moles) was bubbled into the mixture while maintaining the temperature below 10° C. The mixture was kept in an ice bath for several hours and then allowed to stand at room temperature overnight. The bulk of the ether solvent was removed on a steam bath and then the mixture of reaction products was separated by vacuum distillation. The yield (based on glycidaldehyde) of 1,3-bis(expoxyethyl)2-oxapropyl acetate (I), B.P. 90–95° C. (<1 mm.) $n_D^{20}$ 1.4489, was 99 g. (53%).

|   | Found percent | Theory $(C_8H_{12}O_5)$, percent |
|---|---|---|
| C | 51.1 | 51.1 |
| H | 6.4 | 6.4 |
| Expox. value, eq./100 g. (HCl-dioxane) | 0.89 | 1.06 |

A triepoxy compound (II), B.P. 135–138° C. (<1 mm.), $n_D^{20}$ 1.4615, was obtained in 15% yield (17 g.) based upon the moles of glycidaldehyde charged to the reaction.

|   | Found, percent | Theory $(C_{11}H_{16}O_7)$, percent |
|---|---|---|
| C | 50.7 | 50.8 |
| H | 6.2 | 6.2 |
| Expox. value eq./100 g. (HCl-dioxane) | 1.00 | 1.15 |

The epoxy compounds including III) remaining in the residue (16 g.) had an epoxide value of .66 eq./100 g.

I claim as my invention:

1. Acylated epoxy acetals of the formula:

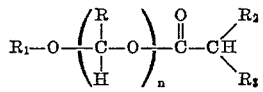

in which (a) $R_1$ is the residue of an alcohol of the group consisting of alkanols and epoxy-alkanols of up to 20 carbon atoms in which the epoxy oxygen bridges adjacent carbon atoms, (b) R is epoxyalkyl of 3 to 20 carbon atoms in which the epoxy oxygen bridges adjacent carbon atoms, (c) $R_2$ and $R_3$ are each selected from the group consisting of the hydrogen atom and a lower alkyl group, and (d) $n$ is an integer from 1 to 3.

2. A compound of the formula:

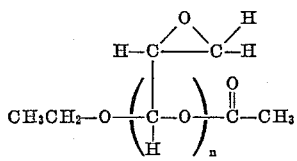

wherein $n$ is an integer selected from the group consisting of the integers 1, 2 and 3.

3. Polyepoxy acetal acetates of the formula:

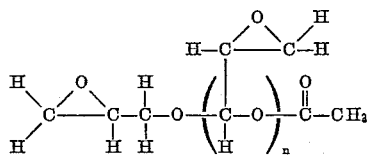

wherein $n$ is an integer from 1 to 3.

4. A compound of the formula:

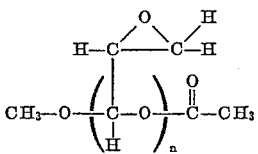

where $n$ is an integer from 1 to 3.

5. An acetoxy diglycidyl ether of the structural formula:

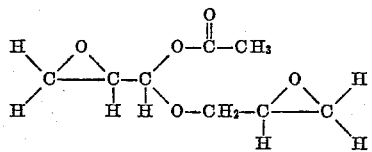

References Cited in the file of this patent

UNITED STATES PATENTS

| 2,668,862 | Price | Feb. 9, 1954 |
| 2,883,396 | Phillips et al. | Apr. 21, 1959 |
| 2,925,426 | Schroeder | Feb. 16, 1960 |
| 3,029,253 | Wheeler et al. | Apr. 10, 1962 |

FOREIGN PATENTS

| 170,190 | Sweden | Jan. 26, 1960 |